United States Patent
Ge et al.

(10) Patent No.: US 11,012,130 B2
(45) Date of Patent: *May 18, 2021

(54) RANK INDICATION METHOD, RANK INDICATION REPORTING METHOD, DEVICE AND SYSTEM, AND STORAGE MEDIUM

(71) Applicant: Huawei Technologies Co., Ltd., Shenzhen (CN)

(72) Inventors: Shibin Ge, Shanghai (CN); Wei Han, Shanghai (CN); Xiaoyan Bi, Shanghai (CN); Hongzhe Shi, Shanghai (CN); Ye Wu, Shanghai (CN); Huangping Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,219

(22) Filed: Nov. 14, 2019

(65) Prior Publication Data

US 2020/0083940 A1 Mar. 12, 2020

Related U.S. Application Data

(63) Continuation of application No. 16/237,509, filed on Dec. 31, 2018, now Pat. No. 10,505,605, which is a (Continued)

(30) Foreign Application Priority Data

Dec. 8, 2017 (CN) .......................... 201711297861.0

(51) Int. Cl.
*H04B 7/0456* (2017.01)
*H04B 7/06* (2006.01)
*H04W 80/02* (2009.01)

(52) U.S. Cl.
CPC .......... *H04B 7/0486* (2013.01); *H04B 7/063* (2013.01); *H04B 7/0626* (2013.01);
(Continued)

(58) Field of Classification Search
CPC .... H04B 7/0486; H04B 7/063; H04B 7/0632; H04B 7/626; H04W 80/02
See application file for complete search history.

(56) References Cited

U.S. PATENT DOCUMENTS 10,505,605 B2 * 12/2019 Ge ...................... H04B 7/0486
2010/0271970 A1 10/2010 Pan et al.
(Continued)

FOREIGN PATENT DOCUMENTS

CN 102523026 A 6/2012
CN 103178891 A 6/2013
(Continued)

OTHER PUBLICATIONS

U.S. Appl. No. 16/237,509, filed Dec. 31, 2018, patented.
(Continued)

*Primary Examiner* — Mohammad S Anwar
(74) *Attorney, Agent, or Firm* — Leydig, Voit & Mayer, Ltd.

(57) ABSTRACT

This application provides a technical solution for rank indication, and especially when a CQI number is not configured or a CQI number is 1, a network device configures a rank indication restriction parameter as that at least one of ranks whose index numbers are 0, 1, 2, and 3 is allowed to be reported by the terminal device; or even if the network device does not perform the foregoing configuration, and none of the ranks whose index numbers are 0, 1, 2, and 3 is allowed to be reported, the terminal device may select at least one rank for RI reporting, so as to resolve a problem that a system cannot work. In addition, according to embodi- (Continued)

ments of this application, bit overheads required for RI reporting may further be reduced.

19 Claims, 3 Drawing Sheets

Related U.S. Application Data continuation of application No. PCT/CN2018/092129, filed on Jun. 21, 2018.

(52) U.S. Cl.
CPC ......... H04B 7/0632 (2013.01); H04B 7/0639 (2013.01); *H04W 80/02* (2013.01)

(56) References Cited

U.S. PATENT DOCUMENTS

| | | | |
|---|---|---|---|
| 2012/0082248 A1* | 4/2012 | Han | H04L 25/03929 375/259 |
| 2013/0121312 A1* | 5/2013 | Roman | H04B 7/0486 370/335 |
| 2013/0182789 A1* | 7/2013 | Ko | H04B 7/0626 375/267 |
| 2014/0307824 A1 | 10/2014 | Shen et al. | |
| 2014/0341055 A1 | 11/2014 | Fan | |
| 2015/0341092 A1 | 11/2015 | Park et al. | |
| 2017/0180099 A1 | 6/2017 | Kim et al. | |

FOREIGN PATENT DOCUMENTS

| | | |
|---|---|---|
| CN | 105009626 A | 10/2015 |
| CN | 106134120 A | 11/2016 |
| EP | 3493425 A1 | 6/2019 |
| KR | 20110114481 A | 10/2011 |

OTHER PUBLICATIONS

"Work plan for Rel-15 NR WI", 3GPP TSG RAN WG1 Meeting #90bis, Prague, CZ, R1-1718177, XP051352885, pp. 1-174, 3rd Generation Partnership Project, Valbonne, France (Oct. 9-13, 2017).

"Remaining issues on CSI reporting," 3GPP TSG RAN WG1 Meeting #90bis, Prague, Czech Republic, XP051340557, pp. 1-8, 3rd Generation Partnership Project, Valbonne, France (Oct. 9-13, 2017).

"Offline session notes CSI reporting (AI 7.2.2.2)," 3GPP TSG RAN WG1 Meeting 90bis, Prague, CZ, R1-1719142, pp. 1-6, 3rd Generation Partnership Project, Valbonne, France (Oct. 9-13, 2017).

"Corrections for CSI reporting," 3GPP TSG RAN WG1 Meeting AH 1801, Vancouver, Canada, R1-1800697, Ericsson, pp. 1-10, 3rd Generation Partnership Project, Valbonne, France (Jan. 22-26, 2018).

3rd Generation Partnership Project; Technical Specification Group Radio Access Network; NR; Physical layer procedures for data (Release 15), 3GPP TS 38.214, V1.1.1, R1-1719227, pp. 1-51, 3rd Generation Partnership Project, Valbonne, France (Oct. 2017).

"Details on Resource Element Mapping," 3GPP TSG RAN WG1 Meeting #90, Prague, Czech Republic, R1-1714598, NTT DOCOMO, pp. 1-6, 3rd Generation Partnership Project, Valbonne, France (Aug. 21-25, 2017).

"3rd Generation Partnership Project; Technical Specification Group Radio Access Network; NR; Physical layer procedures for data (Release 15)," 3GPP TS 38.214 V1.2.0, R1-1721051, pp. 1-55, 3rd Generation Partnership Project, Valbonne, France (Nov. 2017).

"3rd Generation Partnership Project; Technical Specification Group Radio Access Network; NR; Multiplexing and channel coding (Release 15)," 3GPP TS 38.212 V1.2.0, R1-1721049, pp. 1-42, 3rd Generation Partnership Project, Valbonne, France (Nov. 2017).

"3rd Generation Partnership Project; Technical Specification Group Radio Access Network; NR; Radio Resource Control (RRC); Protocol specification (Release 15)," 3GPP TS 38.331 V0.1.0, pp. 1-154, 3rd Generation Partnership Project, Valbonne, France (Oct. 2017).

\* cited by examiner

RANK INDICATION METHOD, RANK INDICATION REPORTING METHOD, DEVICE AND SYSTEM, AND STORAGE MEDIUM

CROSS-REFERENCE TO RELATED APPLICATIONS

This application is a continuation of U.S. patent application Ser. No. 16/237,509, filed on Dec. 31, 2018, which is a continuation of International Application No. PCT/CN2018/092129, filed on Jun. 21, 2018, which claims priority to Chinese Patent Application No. 201711297861.0, filed on Dec. 8, 2017. All of the afore-mentioned patent applications are hereby incorporated by reference in their entireties.

TECHNICAL FIELD

This application relates the field of communications technologies, and in particular, to a rank indication method, a rank indication reporting method, a device and a system, and a storage medium.

BACKGROUND

Generally, a network device sends downlink control information (DCI) to a terminal device, to trigger aperiodic channel state information (CSI) reporting and/or uplink data transmission performed by the terminal device. The DCI includes a parameter that indicates the terminal device should perform CSI reporting. CSI reported by the terminal device to the network device usually includes parameters such as a rank indication (RI), a precoding matrix indicator PMI), and a channel quality indication CQI).

A parameter used by the network device to indicate the terminal device should perform CSI reporting is a rank indication restriction (RI restriction). The RI restriction parameter is used to indicate, to the terminal device, PMIs and RIs corresponding to ranks that are allowed to be reported. Another parameter used by the network device to indicate the terminal device should perform CSI reporting is a CQI number or a CQI maximum number (Num_CQI/Max_Num_CQI). The Num_CQI/Max_Num_CQI parameter is used to indicate a number of CQIs or a maximum number of CQIs that are reported by the terminal device. There is an association relationship between the number of CQIs or the maximum number of CQIs reported by the terminal device and a number of RIs reported by the terminal device.

It is found by the inventor during creation of this application that, the RI restriction parameter indicated by the network device to the terminal device conflicts with the Num_CQI/Max_Num_CQI parameter in some cases, and then the terminal device cannot perform RI reporting.

SUMMARY

This application provides a rank indication method, a rank indication reporting method, a device and a system, and a storage medium, to resolve a problem that a terminal device cannot perform RI reporting when an RI restriction parameter indicated by a network device to the terminal device conflicts with a Num_CQI/Max_Num_CQI parameter in some cases. First, a rank indication restriction parameter related to a technical solution in this application is one or more of: TypeI-SinglePanel-RI-Restriction, TypeI-MultiPanel-RI-Restriction, TypeII-RI-Restriction, and TypeII-PortSelection-RI-Restriction.

The technical solution in this application is as follows: according to a first aspect, a rank indication method is provided, and the method includes: configuring, by a network device for a terminal device, a rank indication parameter for channel state information reporting, where the rank indication parameter includes a rank indication restriction parameter that is used to restrict a rank to-be-reported by the terminal device, when the network device has not configured a channel quality indication number for the terminal device, or when a channel quality indication number configured by the network device for the terminal device is 1, the rank indication restriction parameter is configured as that at least one of ranks whose index numbers are 0, 1, 2, and 3 is allowed to be reported by the terminal device; and sending, by the network device, the rank indication parameter to the terminal device, where the rank indication restriction parameter is a bitmap of eight bits, the eight bits are in a one-to-one correspondence to eight ranks, and in the eight bits, a bit that is set to 0 represents that a rank corresponding to the bit is not allowed to be reported by the terminal device, and a bit that is set to 1 represents that a rank corresponding to the bit is allowed to be reported by the terminal device.

In a possible implementation, the rank indication restriction parameter is configured as at least one of ranks whose sequence numbers are 0, 1, 2, and 3 is allowed to be reported by the terminal device includes: not all bits corresponding to the ranks whose index numbers are 0, 1, 2, and 3 are set to 0.

In another possible implementation, that the rank indication restriction parameter is configured as that at least one of the ranks whose index numbers are 0, 1, 2, and 3 is allowed to be reported by the terminal device includes: at least one of bits corresponding to the ranks whose index numbers are 0, 1, 2, and 3 is set to 1.

According to a second aspect, a rank indication reporting method is provided, and the method includes: receiving, by a terminal device, a rank indication parameter from a network device, where the rank indication parameter includes a rank indication restriction parameter that is used to restrict a rank to be reported by the terminal device; and when the terminal device has not received a channel quality indication number configured by the network device for the terminal device, or when a channel quality indication number that is received by the terminal device and configured by the network device for the terminal device is 1, selecting, from ranks whose index numbers are 0, 1, 2, 3, 4, 5, 6, and 7, at least one rank for reporting.

In a possible implementation, when the rank indication restriction parameter received by the terminal device is configured as that at least one of ranks whose index numbers are 0, 1, 2, 3 is allowed to be reported by the terminal device, the terminal device selects, from the ranks whose index numbers are 0, 1, 2, 3, at least one rank indicated by the rank indication restriction parameter for reporting.

The rank indication restriction parameter is a bitmap of eight bits, the eight bits are in a one-to-one correspondence to eight ranks, and in the eight bits, a bit that is set to 0 represents that a rank corresponding to the bit is not allowed to be reported by the terminal device, and a bit that is set to 1 represents that a rank corresponding to the bit is allowed to be reported by the terminal device; and not all bits corresponding to the ranks whose index numbers are 0, 1, 2, and 3 in the rank indication restriction parameter are set to 0, or at least one of bits corresponding to the ranks whose index numbers are 0, 1, 2, and 3 in the rank indication restriction parameter is set to 1.

A manner of selecting, from the ranks whose index numbers are 0, 1, 2, and 3, at least one rank for reporting is: determining that a number of bits used for rank indication reporting is $N_1 = \lceil \log_2 M_1 \rceil$, where $N_1 \geq 1$, $M_1$ is a number of elements in which the bits corresponding to the ranks whose index numbers are 0, 1, 2, and 3 indicated by the rank indication restriction parameter are set to 1, and $N_1$ and $M_1$ are positive integers; and reporting, by using the determined number $N_1$ of bits, an index number of a rank whose corresponding bit is set to 1 in the ranks whose index numbers are 0, 1, 2, and 3.

In another manner, the terminal device determines that a number of bits used for rank indication reporting is equal to min $(2, X_1 = \lceil \log_2 Y_1 \rceil)$, where $X_1 \geq 1$, $Y_1$ is a maximum value of ranks that are allowed to be reported in the ranks whose index numbers are 0, 1, 2, 3, 4, 5, 6, and 7 indicated by the rank indication restriction parameter, and $X_1$ and $Y_1$ are positive integers; and reporting, by using the determined number of bits, a maximum value of ranks that are allowed to be reported in the ranks whose index numbers are 0, 1, 2, and 3 indicated by the rank indication restriction parameter, as the rank indication. In other words, even if the maximum value of the ranks that are allowed to be reported in the ranks whose index numbers are 0, 1, 2, 3, 4, 5, 6, and 7 is greater than 4, it is determined that the number of bits used for rank indication reporting is equal to min $(2, X_1 = \lceil \log_2 Y_1 \rceil)$, a minimum value, 2, is selected, and in this case, the maximum value of the ranks that are allowed to be reported is selected from the ranks whose index numbers are 0, 1, 2, and 3.

In another possible implementation, when the rank indication restriction parameter received by the terminal device is configured as that all the ranks whose index numbers are 0, 1, 2, and 3 are restricted from being reported, the terminal device selects, from the ranks whose index numbers are 0, 1, 2, and 3, one rank for reporting. For example, the one rank may be a rank having a minimum index number, or may be a rank having a minimum value.

In another possible implementation, when the rank indication restriction parameter received by the terminal device is configured as that all the ranks whose index numbers are 0, 1, 2, and 3 are restricted from being reported, the terminal device selects, from the ranks whose index numbers are 0, 1, 2, and 3, a rank whose index number is 0 for reporting. The rank whose index number is 0 may also be referred to as a rank whose value is 1.

In another implementation, when the rank indication restriction parameter received by the terminal device is configured as that all the ranks whose index numbers are 0, 1, 2, and 3 are restricted from being reported, the terminal device selects, from the ranks whose index numbers are 0, 1, 2, 3, 4, 5, 6, and 7, at least one rank for reporting.

According to a third aspect, this application further provides a rank indication reporting method, including: receiving, by a terminal device, a rank indication parameter from a network device, where the rank indication parameter includes a rank indication restriction parameter that is used to restrict a rank to be reported by the terminal device; determining, by the terminal device, based on a number of ranks whose corresponding bits are set to 1 in ranks whose index numbers are 0, 1, 2, 3, 4, 5, 6, and 7 indicated by the rank indication restriction parameter, a number of bits used for rank indication reporting; and reporting, by using the determined number of bits, an index number of a rank whose corresponding bit is set to 1 in the ranks whose index numbers are 0, 1, 2, 3, 4, 5, 6, and 7.

In a possible implementation, when the terminal device has not received a channel quality indication number configured by the network device for the terminal device or when a received channel quality indication number is 1, the terminal device determines that the number of bits used for rank indication reporting is $N_1 = \lceil \log_2 M_1 \rceil$, where $N_1 \geq 1$, $M_1$ is a number of elements in which bits corresponding to ranks whose index numbers are 0, 1, 2, and 3 indicated by the rank indication restriction parameter are set to 1, and $N_1$ and $M_1$ are positive integers; and reporting, by using the determined number $N_1$ of bits, an index number of a rank whose corresponding bit is set to 1 in the ranks whose index numbers are 0, 1, 2, and 3.

In another possible implementation, when a channel quality indication number that is received by the terminal device and configured by the network device for the terminal device is 2, the terminal device determines that the number of bits used for rank indication reporting is $N_2 = \lceil \log_2 M_2 \rceil$, where $N_2 \geq 1$, $M_2$ is a number of elements in which bits corresponding to the ranks whose index numbers are 0, 1, 2, 3, 4, 5, 6, and 7 indicated by the rank indication restriction parameter are set to 1, and $N_2$ and $M_2$ are positive integers; and reporting, by using the determined number of bits, an index number of a rank whose corresponding bit is set to 1 in the ranks whose index numbers are 0, 1, 2, 3, 4, 5, 6, and 7.

According to a fourth aspect, this application further provides a rank indication reporting method, including: receiving, by a terminal device, a rank indication parameter from a network device, where the rank indication parameter includes a rank indication restriction parameter that is used to restrict a rank to be reported by the terminal device; when the terminal device has not received a channel quality indication number configured by the network device for the terminal device, or when a channel quality indication number is 1, determining, by the terminal device, that a number of bits used for rank indication reporting is equal to min $(2, X_1 = \lceil \log_2 Y_1 \rceil)$, where $X_1 \geq 1$, $Y_1$ is a maximum value of ranks that are allowed to be reported in ranks whose index numbers are 0, 1, 2, 3, 4, 5, 6, and 7 indicated by the rank indication restriction parameter, and $X_1$ and $Y_1$ are positive integers; and reporting, by using the determined number of bits, a maximum value of ranks that are allowed to be reported in ranks whose index numbers are 0, 1, 2, and 3 indicated by the rank indication restriction parameter, as the rank indication; or when a channel quality indication number that is received by the terminal device and configured by the network device for the terminal device is 2, determining, by the terminal device, that a number of bits used for rank indication reporting is equal to min $(3, X_2 = \lceil \log_2 Y_2 \rceil)$ where $X_2 \geq 1$, and $Y_2$ is a maximum value of ranks that are allowed to be reported in ranks whose index numbers are 0, 1, 2, 3, 4, 5, 6, and 7 indicated by the rank indication restriction parameter, and $X_2$ and $Y_2$ are positive integers; and reporting, by using the determined number of bits, the maximum value of the ranks that are allowed to be reported in the ranks whose index numbers are 0, 1, 2, 3, 4, 5, 6, and 7 indicated by the rank indication restriction parameter, as the rank indication.

According to a fifth aspect, a network device is provided, and the network device includes: a processing module, configured to: configure, for a terminal device, a rank indication parameter for channel state information reporting, where the rank indication parameter includes a rank indication restriction parameter that is used to restrict a rank to be reported by the terminal device; and when the network device has not configured a channel quality indication number for the terminal device, or when a channel quality indication number configured by the network device for the terminal device is 1, the rank indication restriction parameter is configured as that at least one of ranks whose index numbers are 0, 1, 2, and 3 is allowed to be reported by the terminal device; and a transceiver module, configured to send the rank indication parameter to the terminal device.

In a possible implementation, the processing module is a processor, the transceiver module is a transceiver, a the storage module is a memory.

According to a sixth aspect, a terminal device is provided, and the terminal device includes: a transceiver module, configured to receive a rank indication parameter from a network device, where the rank indication parameter includes a rank indication restriction parameter that is used to restrict a rank to be reported by the terminal device; and a processing unit, configured to: when the transceiver module has not received a channel quality indication number configured by the network device for the transceiver module, or when a channel quality indication number that is received by the transceiver module and configured by the network device for the transceiver module is 1, select, from ranks whose index numbers are 0, 1, 2, 3, 4, 5, 6, and 7, at least one rank for reporting.

According to a seventh aspect, a terminal device is provided, and the terminal device includes: a transceiver module, configured to receive a rank indication parameter from a network device, where the rank indication parameter includes a rank indication restriction parameter that is used to restrict a rank to be reported by the terminal device; and a processing module, configured to: determine, based on a number of ranks whose corresponding bits are set to 1 in ranks whose index numbers are 0, 1, 2, 3, 4, 5, 6, and 7 indicated by the rank indication restriction parameter, a number of bits used for rank indication reporting; and report, by using the determined number of bits, an index number of a rank whose corresponding bit is set to 1 in ranks whose index numbers are 0, 1, 2, and 3.

According to an eighth aspect, a terminal device is provided, and the terminal device includes: a transceiver module, configured to receive a rank indication parameter from a network device, where the rank indication parameter includes a rank indication restriction parameter that is used to restrict a rank to be reported by the terminal device; and a processing module, configured to: when the transceiver module has not received a channel quality indication number configured by the network device for the terminal device or when a channel quality indication number received by the transceiver module is 1, determine, that a number of bits used for rank indication reporting is equal to min (2, $X_1=\lceil\log_2 Y_1\rceil$), where $X_1 \geq 1$, $Y_1$ is a maximum value of ranks that are allowed to be reported in ranks whose index numbers are 0, 1, 2, 3, 4, 5, 6, and 7 indicated by the rank indication restriction parameter, and $X_1$ and $Y_1$ are positive integers; and report, by using the determined number of bits, a maximum value of ranks that are allowed to be reported in ranks whose index numbers are 0, 1, 2, and 3 indicated by the rank indication restriction parameter, as the rank indication.

According to a ninth aspect, a terminal device is provided, and the terminal device includes: a transceiver module, configured to receive a rank indication parameter from a network device, where the rank indication parameter includes a rank indication restriction parameter that is used to restrict a rank to be reported by the terminal device; and a processing module, configured to: when a channel quality indication number that is received by the terminal device and configured by the network device for the terminal device is 2, determine that a number of bits used for rank indication reporting is equal to min (3, $X_2=\lceil\log_2 Y_2\rceil$), where $Y_2$ is a maximum value of ranks that are allowed to be reported in ranks whose index numbers are 0, 1, 2, 3, 4, 5, 6, and 7 indicated by the rank indication restriction parameter, and $X_2$ and $Y_2$ are positive integers; and the processing module is configured to report, by using the determined number of bits, the maximum value of the ranks that are allowed to be reported in the ranks whose index numbers are 0, 1, 2, 3, 4, 5, 6, and 7 indicated by the rank indication restriction parameter, as the rank indication.

In a possible implementation of the sixth to the ninth aspects, the processing module is a processor, the transceiver module is a transceiver, a the storage module is a memory.

According to a tenth aspect, a rank indication system is provided, and the rank indication system includes the network device according to the fifth aspect and the terminal device according to any one of the sixth to the ninth aspects.

According to an eleventh aspect, a processing apparatus is provided, and the processing apparatus includes at least one circuit.

In a possible implementation, the at least one circuit is configured to perform the rank indication method according to the first aspect; and the processing apparatus may be a processor, the processor is configured to perform the rank indication method according to the first aspect, and sending and receiving steps used therein should be understood as steps performed by the processor by using the transceiver.

In another possible implementation, the at least one circuit is configured to perform the rank indication reporting method according to any one of the second aspect to the fourth aspect; and the processing apparatus may be a processor, the processor is configured to perform the rank indication reporting method according to any one of the second aspect to the fourth aspect, and sending and receiving steps used therein should be understood as steps performed by the processor by using the transceiver.

According to a twelfth aspect, a communications device is provided, the communications device may be a network device or a terminal device, and the communications device includes a memory; and a processor, configured to read an indicateion, where when the communications device is a network device, the processor performs the rank indication method according to the first aspect, and sending and receiving steps used therein may be understood as steps performed by the processor by using a transceiver; or when the communications device is a terminal device, the processor performs the rank indication reporting method according to any one of the second aspect to the fourth aspect, and sending and receiving steps used therein may be understood as steps performed by the processor by using a transceiver.

The communications device may further include a memory that is configured to store the indicateion executed by the processor, and the memory may be a non-transitory (non-transitory) memory, for example, a read-only memory (Read Only Memory, ROM), that may be integrated into a same chip with the processor or may be separately disposed on another different chip. A type of the memory and setting manners of the memory and the processor are not limited in this application.

According to a thirteenth aspect, a computer readable storage medium is provided, the computer readable storage medium stores an indicateion, and when being run on a processing component of a computer, the indicateion enables the processing component to perform the rank indication method according to the first aspect or the rank indication reporting method according to any one of the second aspect to the fourth aspect. The computer readable storage medium may be a non-transitory (non-transitory) storage medium.

According to a fourteenth aspect, a chip is provided, the chip includes a programmable logic circuit and/or a program indicateion, and when the chip is run, the programmable logic circuit and/or the program indicateion are/is configured to implement the rank indication method according to the first aspect or the rank indication reporting method according to any one of the second aspect to the fourth aspect.

According to a fifteenth aspect, a computer program product is provided, and when being run on a processing component of a computer, the computer program product enables the processing component to perform the rank indication method according to the first aspect or the rank indication reporting method according to any one of the second aspect to the fourth aspect.

It should be noted that in the implementations of the first aspect to the fifteenth aspect, ranks whose index numbers are 0, 1, 2, 3, 4, 5, 6, and 7 respectively correspond to ranks whose values are 1, 2, 3, 4, 5, 6, 7, 8, to be specific, respectively correspond to a rank 1, a rank 2, a rank 3, a rank 4, a rank 5, a rank 6, a rank 7, and a rank 8.

In another implementation, an index number of a rank may start from 1; and ranks whose index numbers are 1, 2, 3, 4, 5, 6, 7, and 8 respectively correspond to ranks whose values are 1, 2, 3, 4, 5, 6, 7, and 8, namely, a rank 1, a rank 2, a rank 3, a rank 4, a rank 5, a rank 6, a rank 7, and a rank 8.

Certainly, there are other forms in which index numbers correspond to values of ranks. For example, index numbers 8, 7, 6, 5, 4, 3, 2, and 1 respectively represent a rank 1, a rank 2, a rank 3, a rank 4, a rank 5, a rank 6, a rank 7, and a rank 8; or index numbers 7, 6, 5, 4, 3, 2, 1, and 0 respectively represent a rank 1, a rank 2, a rank 3, a rank 4, a rank 5, a rank 6, a rank 7, and a rank 8.

In this application, the ranks whose values are 1, 2, 3, 4, 5, 6, 7, and 8 are the rank 1, the rank 2, the rank 3, the rank 4, the rank 5, the rank 6, the rank 7, and the rank 8.

A correspondence between an index number and a value of a rank is not limited in this application. Provided that the correspondence meets the core idea of this application, the correspondence falls within the protection scope of this application.

In addition, a rank v may be represented as a rank-v, or a v-rank, and a rank may also be referred to as a layer (layer) and may be represented as a layer v, a layer-v, a v layer, or a v-layer, all of which can replace the rank v in this application. A representation form of the rank is not limited in this application and falls within the protection scope of this application.

The technical solution provided in this application brings the following beneficial effects: On one hand, when the RI restriction parameter indicated by the network device to the terminal device conflicts with the Num_CQI/Max_Num_CQI parameter in some cases, and especially when the network device does not configure the Num_CQI/Max_Num_CQI parameter or a configured Num_CQI/Max_Num_CQI parameter is equal to 1, an RI reporting mechanism is provided with reference to the rank indication restriction parameter, so that the terminal device can normally perform RI reporting.

On the other hand, when the terminal device performs RI reporting, the number of bits to be reported is determined based on an index number of a rank whose bit are set to 1. Alternatively, when the Num_CQI/Max_Num_CQI parameter takes different values, a relatively small number of bits is selected for RI reporting from: a number of bits needed by a maximum value of ranks that are allowed to be reported, 2, and 3. Reporting bit overheads can be greatly reduced in the two manners.

DESCRIPTION OF EMBODIMENTS

Figure 1:
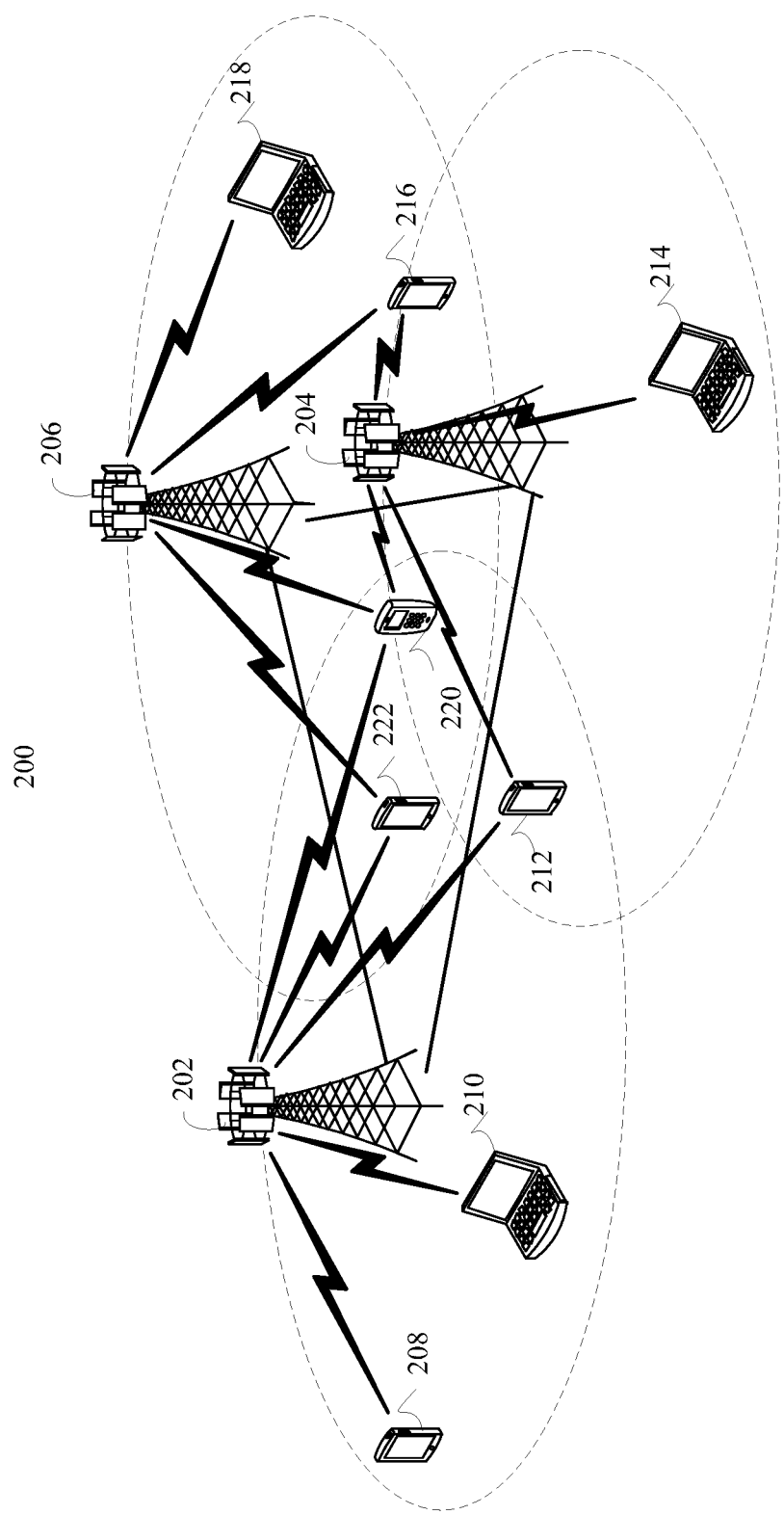
FIG. 1 is a schematic diagram of an implementation environment according to an embodiment of this application.

To make the objectives, technical solutions, and advantages of this application clearer, the following further describes the implementations of this application in detail with reference to the accompanying drawings.

A network device sends downlink control information (DCI) to a terminal device, to trigger aperiodic channel state information (CSI) reporting and/or uplink data transmission performed by a terminal device. The DCI includes a parameter that indicates the terminal device should perform CSI reporting. CSI reported by the terminal device to the network device usually includes parameters such as a rank indication (RI), a precoding matrix indicator (PMI), and a channel quality indication (CQI).

A parameter used by the network device to indicate the terminal device should perform CSI reporting is a rank indication restriction (RI restriction), and the RI restriction parameter field is used to indicate, to the terminal device, PMIs and RIs corresponding to ranks (rank) that are allowed to be reported. Another parameter used by the network device to indicate the terminal device to perform CSI reporting is a CQI number or a CQI maximum number (Num_CQI/Max_Num_CQI). The Num_CQI/Max_Num_CQI parameter is used to indicate the number of CQIs or a maximum number of CQIs that are reported by the terminal device. There is an association relationship between the number of CQIs or the maximum number of CQIs reported by the terminal device and the number of RIs reported by the terminal device.

There are four parameters about the RI restriction: TypeI-SinglePanel-RI-Restriction (used for PMI and RI restriction of a TypeI-SinglePannel-codebook), TypeI-MultiPanel-RI-Restriction (used for PMI and RI restriction of a TypeI-MultiPannel-codebook), TypeII-RI-Restriction (used for PMI and RI restriction of a TypeII-codebook), and TypeII-PortSelection-RI-Restriction (used for PMI and RI restriction of a TypeII-Port Selection-codebook).

The rank indication restriction parameter in this application is any one or more of the TypeI-SinglePanel-RI-Restriction, the TypeI-MultiPanel-RI-Restriction, the TypeII-RI-Restriction TypeII-RI-Restriction, and the TypeII-PortSelection-RI-Restriction.

In this application, restrictions on the CQI number and the RI restriction are provided by using the TypeI-SinglePanel- RI-Restriction as an example. However, content in this application may also be used for the foregoing three other parameters. The TypeI-SinglePanel-RI-Restriction is in a form of a bitmap of eight bits, and the TypeI-SinglePanel-RI-Restriction=$[r_7, r_6, r_5, r_4, r_3, r_2, r_1, r_0]$. A bit $r_0$ is a least significant bit (LSB), and corresponds to a rank whose index number is 0 and whose value is 1; a bit $r_7$ is an MSB, a most significant bit (MSB), and corresponds to a rank whose index number is 7 and whose value is 8. The rest can be deduced by analogy.

Assuming that a bit $r_0$ corresponds to a rank 1 (which may also be described as 1-layer or 1 layer), a bit $r_1$ corresponds to a rank 2, . . . , a bit $r_7$ represents a rank 8 (which may also be described as 8-layer or 8 layers), an index number of a rank is i, where i∈{0, 1, . . . , 7}, and i is also referred to as a sequence number of a rank. A bit value of $r_i$ is corresponding to a rank whose index number is i, a rank v (which may also be described as v-layer or v layers) represents that a rank has a value of v, where v=i+1, and if the bit $r_i$ is set to 0, a PMI and an RI of the rank corresponding to $r_i$ are not allowed to be reported.

Assuming that a bit $r_0$ represents a rank 8 (which may also be described as 8-layer or 8 layers), a bit r1 represents a rank 7, . . . , a bit $r_7$ represents a rank 1 (which may also be described as 1-layer or 1 layer), an index number of a rank is i, where i∈{0, 1, . . . , 7}, and i is also referred to as a sequence number of a rank. A bit value of $r_i$ is corresponding to a rank whose index number is i, a rank v (which may also be described a v-layer or v layers) represents that a rank has a value of v, where v=8−i, and if the bit $r_i$ is set to 0, a PMI and an RI of a rank corresponding to $r_i$ are not allowed to be reported.

In this application, an example in which the bit $r_0$ corresponds to the rank 1, the bit $r_1$ corresponds to the rank 2, . . . , and $r_7$ corresponds to the rank 8 is used. However, this application is also applicable to a case in which the bit $r_0$ corresponds to the rank 8, $r_1$ corresponds to the rank 7, . . . , and $r_7$ corresponds to the rank 1.

Another parameter used by the network device to indicate the terminal device to perform CSI reporting is a CQI number or a CQI maximum number (Num_CQI/Max_Num_CQI). Specifically, if the parameter is not set or the parameter is set to 1, the terminal device reports only one CQI. It should be noted that, the CQI is a wideband CQI (wideband CQI), and if the CQI is a subband CQI (subband CQI), the terminal device reports only one CQI in each subband. Unless otherwise stated, the CQI number in the following description of this application is a wideband CQI number, and when a CQI is reported, correspondingly, at most four RIs can be reported.

If the parameter is configured as 2, in a possible implementation: in this case, the terminal device reports two CQIs at most, and the terminal device may determine, based on a status of the RI, whether to report one CQI or two CQIs. For example, if the RI is greater than 4, the terminal device reports two CQIs; if the RI is not greater than 4, the terminal device reports one CQI.

In another possible implementation, the terminal device reports two CQIs.

Definitions and applications of the two parameters, namely, the CQI number and the RI restriction, are described above. However, in some cases, the two parameters, namely, the CQI number and the RI restriction, have the following problems:

In one example, when a base station configures that the TypeI-SinglePanel-RI-Restriction=$[r_7, r_6, r_5, r_4, r_3, r_2, r_1, r_0]$=[1, 0, 1, 0, 0, 0, 0, 0], and does not configure the Num_CQI or configures that Num_CQI=1, based on an indication of the TypeI-SinglePanel-RI-Restriction, an RI less than or equal to 4 cannot be reported; and when the base station does not configure the Num_CQI or configures that Num_CQI=1, the base station indicates that the terminal device can report only one CQI, namely, a maximum to-be-reported RI is 4, that is, a rank 4 whose index number is $r_3$ and whose value is 4. The two indications conflict with each other, and after the terminal device receives the two parameters, the terminal device does not know how to report the RI, causing a system bug. This is a technical problem that needs to be urgently resolved in this application.

In another example, when the network device configures that the TypeI-SinglePanel-RI-Restriction=$[r_7, r_6, r_5, r_4, r_3, r_2, r_1, r_0]$=[1, 0, 1, 0, 0, 1, 0, 1], and does not configure the Num_CQI or configures that Num_CQI=1, in this case, a maximum RI to be reported by the terminal device is 4, and based on [1, 0, 1, 0, 0, 1, 0, 1], although a case in which the terminal device does not know how to report the RI does not occur when the terminal device selects the rank 3 corresponding to the bit $r_2$ for reporting, there are unnecessary RI reporting overheads. A number of bits (RI payload) occupied by the RI reporting depends on a configuration of the RI restriction parameter. For example, the TypeI-SinglePanel-RI-Restriction in this paragraph=$[r_7, r_6, r_5, r_4, r_3, r_2, r_1, r_0]$=[1, 0, 1, 0, 0, 1, 0, 1], and $r_7$=1; it indicates that the rank 8 is allowed to be reported, the rank 8 is reported at most, and three bits are needed. Also in this case, as stipulated in a standard, the number of bits for the RI reporting is three bits. However, in this case, the Num_CQI is not configured or the Num_CQI is equal to 1, a maximum to-be-reported RI cannot exceed 4. To be specific, even if in the TypeI-SinglePanel-RI-Restriction, more than four ranks are allowed to be reported, in the Num_CQI, it is not allowed to report more than four ranks. In this case, 2-bit overheads may be sufficient for the RI. An RI payload calculation method is merely provided herein as an example. In this case, waste of reporting overheads is caused. This is a technical problem 2 to be urgently resolved in this application.

Embodiments of this application provide a technical solution, which includes a rank indication method, a rank indication reporting method, a network device, a terminal device, a communications system, a processing apparatus, a chip, a storage medium, and the like, to help resolve the foregoing first technical problem and avoid a system bug, and further help resolve the second technical problem, so as to reduce reporting overheads.

The technical solution provided in the embodiments of this application is described in detail below with reference to the accompanying drawings and embodiments.

FIG. 1 is a schematic diagram of an implementation environment related to the embodiments of this application. The implementation environment provides a wireless communications network 200, and the wireless communications network 200 may include a plurality of base stations and a plurality of terminal devices. As shown in FIG. 1, the plurality of base stations include base stations 202 to 206, and the plurality of terminal devices include terminal devices 208 to 222. Any two base stations in the base stations 202 to 206 may communicate with each other by using a backhaul link (as shown by straight lines between the base stations 202 to 206), and the backhaul link may be a wired backhaul link, or may be a wireless backhaul link. The wired backhaul link is, for example, an optical fiber or a copper cable, and the wireless backhaul link is, for example, a microwave. Any terminal device in the terminal devices

208 to 222 may communicate with a corresponding base station by using a radio link (as shown by zigzag lines between the base stations 202 to 206 and the terminal devices 208 to 222).

Dependent on wireless communications technologies used by the base stations, any one of the base stations 202 to 206 may also be referred to as a NodeB, an evolved NodeB (eNodeB), an access point ( ) or the like. In addition, according to a size of a service coverage area provided by the base stations, the base stations may be classified into a macro base station used to provide a macro cell, a micro base station used to provide a pico cell, a femto base station used to provide a femto cell, and the like. With continuous evolution of the wireless communications technologies, another name may also be used for a future base station.

Any one of the terminal devices 208 to 222 may be any wireless communications devices having a wireless communications function, for example, but not limited to, a mobile cellular phone, a cordless phone, a Session Initiation Protocol (SIP) phone, a personal digital assistant (PDA), a smartphone, a notebook computer, a tablet computer, a wireless data card, a wireless modulator demodulator (Modem), a wearable device (for example, a smart watch), or an in-vehicle device. Since advent of Internet of Things (IoT) technologies, more devices that do not have a communication function previously, which are for example, but not limited to, a household appliance, a vehicle, tool equipment, a service device, and a service facility, are equipped with a wireless communications unit to provide a wireless communications function, and therefore can access a wireless communications network and receive remote control. Such devices, equipped with the wireless communications unit and having the wireless communications function also fall within the scope of wireless communications devices. In addition, the terminal devices 208 to 222 may alternatively be mobile stations, mobile devices, mobile terminal devices, wireless terminal devices, handheld devices, clients, or the like.

The base stations 202 to 206 usually serve as access devices, the terminal devices 208 to 222 usually serve as user equipment, and the base stations 202 to 206 may provide a wireless access service for the terminal devices 208 to 222. Each base station corresponds to a service coverage area (which may also be referred to as a cell, as shown by each ellipticalarea in FIG. 1), and a terminal device entering the service coverage area of a base station may communicate with the base station by using a radio signal, to receive the wireless access service provided by the base station. Service coverage areas of different base stations may overlap, and a terminal device in an overlapping area may receive radio signals from a plurality of base stations. Therefore, the base stations whose service coverage areas overlap may coordinate with each other and provide a service for the terminal device in the overlapping area. For example, the plurality of base stations may serve for the terminal device in the overlapping area by using a coordinated multipoint (CoMP) technology. For example, as shown in FIG. 1, service coverage areas of the base station 202 and the base station 206 overlap, and a terminal device 222 is located in the overlapping area. Therefore, the terminal device 222 may receive radio signals from the base station 202 and the base station 206, and the base station 202 and the base station 206 may coordinate with each other to provide a service for the terminal device 222. For another example, as shown in FIG. 1, a same overlapping area exists in service coverage areas of the base station 202, the base station 204, and the base station 206, and a terminal device 220 is located in the overlapping area. Therefore, the terminal device 220 may receive radio signals from the base station 202, the base station 204 and the base station 206, and the base station 202, the base station 204, and the base station 206 may coordinate with each other and provide a service for the terminal device 220.

In this application, a plurality of antennas may be configured on each of the base stations 202 to 206 and the terminal devices 208 to 222, to support a Multi-input Multi-output (MIMO) technology. Further, the base stations 202 to 206 and the terminal devices 208 to 222 may support a single-user MIMO (SU-MIMO) technology, or may support a multi-user MIMO (MU-MIMO). The MU-MIMO technology may be implemented based on a space division multiple access (SDMA) technology. Provided with the plurality of antennas, the base stations 202 to 206 and the terminal devices 208 to 222 may further flexibly support a single-input single-output (SISO) technology, a single-input multiple-output (SIMO) technology, and a multiple-input-single-output (MISO) technology, to implement various diversity (for example, but not limited to, transmit diversity and receive diversity) and multiplexing technologies. The diversity technology may include but is not limited to a transmit diversity (TD) technology and a receive diversity (RD) technology, and the multiplexing technology may be a spatial multiplexing (Spatial Multiplexing) technology. Moreover, the foregoing technologies may further include various implementation solutions. For example, the transmit diversity technology may include but is not limited to diversity manners, for example, space-time transmit diversity (STTD), space-frequency transmit diversity (SFTD), time switched transmit diversity (TSTD), frequency switched transmit diversity (FSTD), orthogonal transmit diversity (OTD), and cyclic delay diversity (CDD), and a diversity manner obtained after derivation, evolution, and combination of the foregoing diversity manners. For example, in a current LTE standard, transmit diversity manners such as space time block coding (STBC), space frequency block coding (SFBC), and CDD are used. A general description of the transmit diversity is provided above by using examples. A person skilled in the art should understand that, in addition to the foregoing examples, the transmit diversity further includes a plurality of other implementations. Therefore, the foregoing description should not be understood as a limitation on the technical solution of this application, and the technical solution of this application should be understood as being suitable for various possible transmit diversity solutions.

In addition, the base stations 202 to 206 and the terminal devices 208 to 222 may perform communication by using various wireless communications technologies. The wireless communications technologies include but are not limited to, a time division multiple access (TDMA) technology, a frequency division multiple access (FDMA) technology, a code division multiple access (CDMA) technology, a time division-synchronous code division multiple access (TD-SCDMA) technology, an orthogonal frequency division multiple access (OFDMA) technology, a single carrier frequency division multiple access (SC-FDMA) technology, a space division multiple access (SDMA) technology, and an evolved and derived technology of these technologies. The foregoing wireless communications technologies are accepted in a plurality of wireless communication standards as a radio access technology (RAT), to construct various wireless communications systems (or networks) currently well known to people. The wireless communications system may include but is not limited to a Global System for Mobile Communications (GSM), CDMA2000, wideband CDMA (WCDMA), Wi-Fi defined in the 802.22 series of standards, Worldwide Interoperability for Microwave Access (WiMAX), LTE, LTE-advanced (LTE-A), an evolved system of these wireless communications systems, and the like. Unless otherwise stated, the technical solution provided in the embodiments of this application may be applied to the wireless communications technologies and wireless communications systems described above. In addition, the terms "system" and "network" may be interchanged.

It should be noted that, the wireless communications network 200 shown in FIG. 1 is used merely as an example, and is not intended to limit the technical solution of this application. A technical person skilled in the art should understand that, in a specific implementation process, the wireless communications network 200 may further include another device, and quantities of the base stations and the terminal devices may be configured as specifically required. In a specific implementation process, any one of the base stations 202 to 206 shown in FIG. 1 may serve as a transmit end device, and any one of the terminal devices 208 to 222 may serve as a receive end device.

Figure 2:
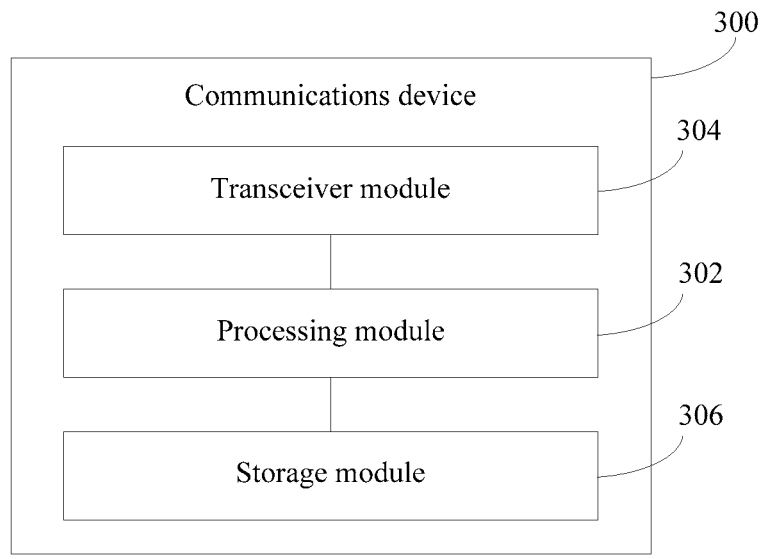
FIG. 2 is a schematic diagram of a logical structure of a communications device according to an embodiment of this application.

FIG. 2 is a schematic diagram of a logical structure of a communications device 300 according to an embodiment of this application. The communications device 300 may be a transmit end device (for example, any base station in the implementation environment shown in FIG. 1), or may be a receive end device (for example, any terminal device in the implementation environment shown in FIG. 1). Referring to FIG. 2, the communications device 300 may include: a processing module 302, a transceiver module 304, and a storage module 306. Functions of the modules are described in detail below. In a specific implementation process, the processing module 302 may be implemented by a processor 402 in a communications device 400 to be described below, or implemented by a processor 402 and a memory 408 in a communications device 400. Certainly, another implementation may alternatively be used. The transceiver module 304 may be implemented by a transceiver 404 in the communications device 400, and the storage module 306 may be implemented by the memory 408 in the communications device 400. Certainly, another implementation may alternatively be used.

Optionally, the storage module 306 may be configured to store configuration parameters described in the following method embodiments, for example, a parameter used in CSI reporting by a terminal device.

The parameter includes at least one of the following: parameters such as a rank indication (RI), a precoding matrix indicator (PMI), and a channel quality indication (CQI).

The rank indication (RI) includes a rank indication restriction (RI restriction) parameter, and this parameter is used to indicate, to the terminal device, PMIs and RIs corresponding to those ranks that are allowed to be reported.

The channel quality indication (CQI) includes a CQI number or a CQI maximum number (Num_CQI/Max_Num_CQI), and this parameter is used to indicate the number of CQIs or a maximum number of CQIs reported by the terminal device.

There is an association relationship between the number of CQIs or the maximum number of CQIs reported by the terminal device and a number of RIs reported by the terminal. The CQI number or the CQI maximum number in this specification may be interchangeable.

Figure 3:
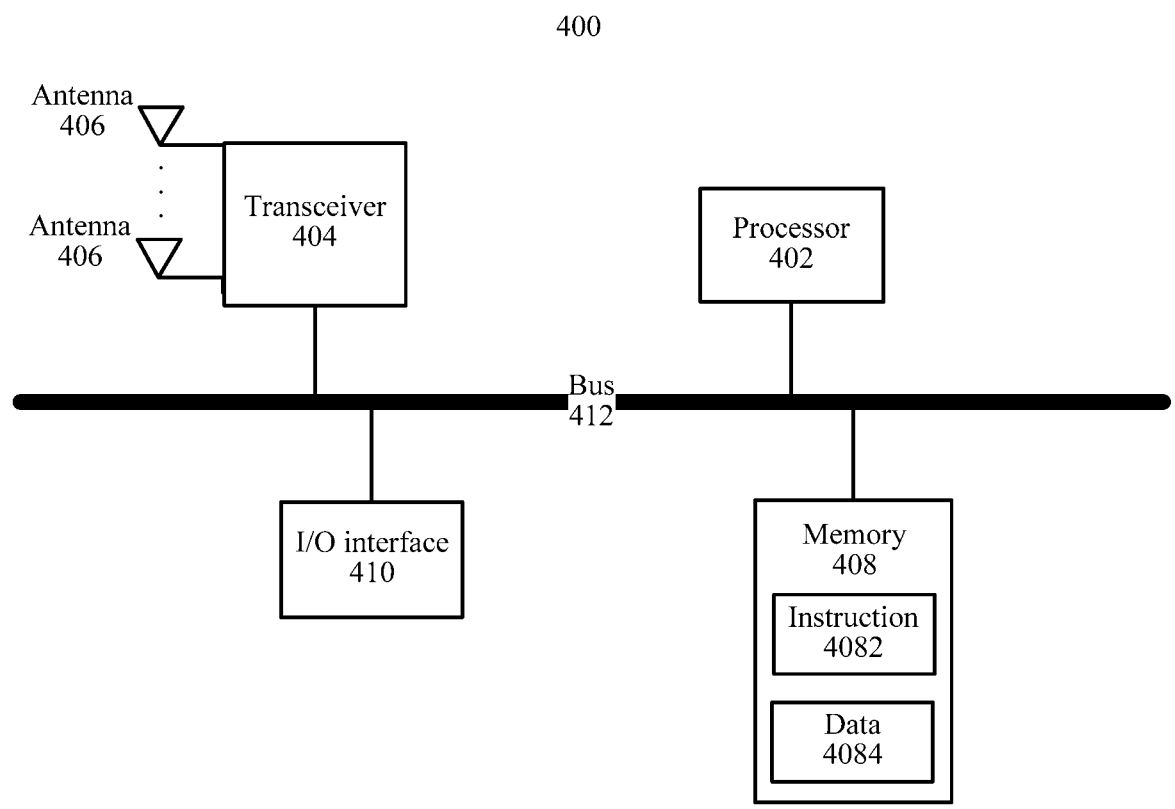
FIG. 3 is a schematic diagram of a hardware structure of a communications device according to an embodiment of this application.

FIG. 3 is a schematic diagram of a hardware structure of a communications device 400 according to an embodiment of this application. The communications device 400 may be a transmit end device (for example, any base station in the implementation environment shown in FIG. 1), or may be a receive end device (for example, any terminal device in the implementation environment shown in FIG. 1). Referring to FIG. 3, the communications device 400 includes a processor 402, a transceiver 404, a plurality of antennas 406, a memory 408, an input/output (I/O) interface 410, and a bus 412. The memory 408 may be configured to store an indicateion 4082 and data 4084. In addition, the processor 402, the transceiver 404, the memory 408, and the I/O interface 410 are in a communication connection with each other by using the bus 412, and the plurality of antennas 406 are connected to the transceiver 404. It needs to be noted that the connection manner between the processor 402, the transceiver 404, the memory 408, and the I/O interface 410 shown in FIG. 3 is merely an example, and in a specific implementation process, the processor 402, the transceiver 404, the memory 408, and the I/O interface 410 may be in a communication connection with each other in other connection manners than the bus 412.

The processor 402 may be a general-purpose processor, the general-purpose processor may be a processor that performs a particular step and/or operation by reading and executing an indicateion (for example, the indicateion 4082) stored in a memory (for example, the memory 408). In a process of performing the foregoing steps and/or operations, the general-purpose processor may use data (for example, the data 4084) stored in the memory (for example, the memory 408). The general-purpose processor may be, for example, but not limited to, a central processing unit (CPU). In addition, the processor 402 may be a special-purpose processor, and the special-purpose processor may be a processor that is specifically designed and configured to perform a particular step and/or operation. The special-purpose processor may be, for example, but not limited to, a digital signal processor (DSP), an application-specific integrated circuit (ASIC), or a field programmable gate array (FPGA). In addition, the processor 402 may further be a combination of a plurality of processors, for example, a multi-core processor. The processor 402 may include at least one circuit, to perform steps in a rank indication method in the following embodiment.

The transceiver 404 is configured to send and receive a signal. Optionally, the transceiver 404 receives and sends a signal by using at least one of the plurality of antennas 406.

The memory 408 may be a storage medium of different types, for example, a random access memory (RAM), a ROM, a non-volatile RAM (NVRAM), a programmable ROM (PROM), an erasable PROM (EPROM), an electrically erasable PROM (EEPROM), a flash, an optical memory, or a register. The memory 408 is specifically configured to store the indicateion 4082 and the data 4084. When the processor 402 is a general-purpose processor, the processor 402 may perform a particular step and/or operation by reading and executing the indicateion 4082 stored in the memory 408. In a process of performing the foregoing steps and/or operations, the data 4084 may need to be used.

Optionally, the memory 408 may be configured to store configuration parameters described in the following method embodiments, for example, a parameter used in CSI reporting by a terminal device.

The parameter includes at least one of the following: parameters such as a rank indication (RI), a precoding matrix indicator (PMI), and a channel quality indication (CQI).

The rank indication (RI) includes a rank indication restriction (RI restriction) parameter, and this parameter is used to indicate, to the terminal device, PMIs and RIs corresponding to ranks that are allowed to be reported.

The channel quality indication (CQI) includes a CQI number or a CQI maximum number (Num_CQI/Max_Num_CQI), and this parameter is used to indicate a number of CQIs or a maximum number of CQIs reported by the terminal device.

There is an association relationship between the number of CQIs or the maximum number of CQIs reported by the terminal device and a number of RIs reported by the terminal device. The CQI number or the CQI maximum number in this specification may be interchangeable.

The I/O interface 410 is configured to receive an indicateion and/or data from a peripheral device, and output the indicateion and/or the data to the peripheral device.

In a specific implementation process, the processor 402 may be configured to perform, for example, but not limited to, baseband-related processing, and the transceiver 404 may be configured to perform, for example, but not limited to, radio frequency receiving and sending. The components may be separately disposed on chips independent of each other, or may be at least partially or entirely disposed on a same chip. For example, the processor 402 may further be classified into an analog baseband processor and a digital baseband processor. The analog baseband processor and the transceiver 404 may be integrated on a same chip, or the digital baseband processor may be disposed on an independent chip. With continuous development of an integrated circuit technology, more components can be integrated on a same chip. For example, the digital baseband processor and various application processors (for example, but not limited to a graphics processing unit and a multimedia processor) may be integrated on a same chip. Such a chip may be referred to as a system on chip (System on Chip). Usually, whether components are independently disposed on different chips or integrated and disposed on one or more chips depends on a specific requirement of a product design. Specific implementations of the foregoing components are not limited in this embodiment of this application.

It should be noted that the communications device 400 shown in FIG. 3 is merely an example, and in a specific implementation process, the communications device 400 may further include other hardware components, which are not enumerated one by one in this specification. Specific functions of the hardware components in the communications device 400 are described in detail below.

Figure 4:
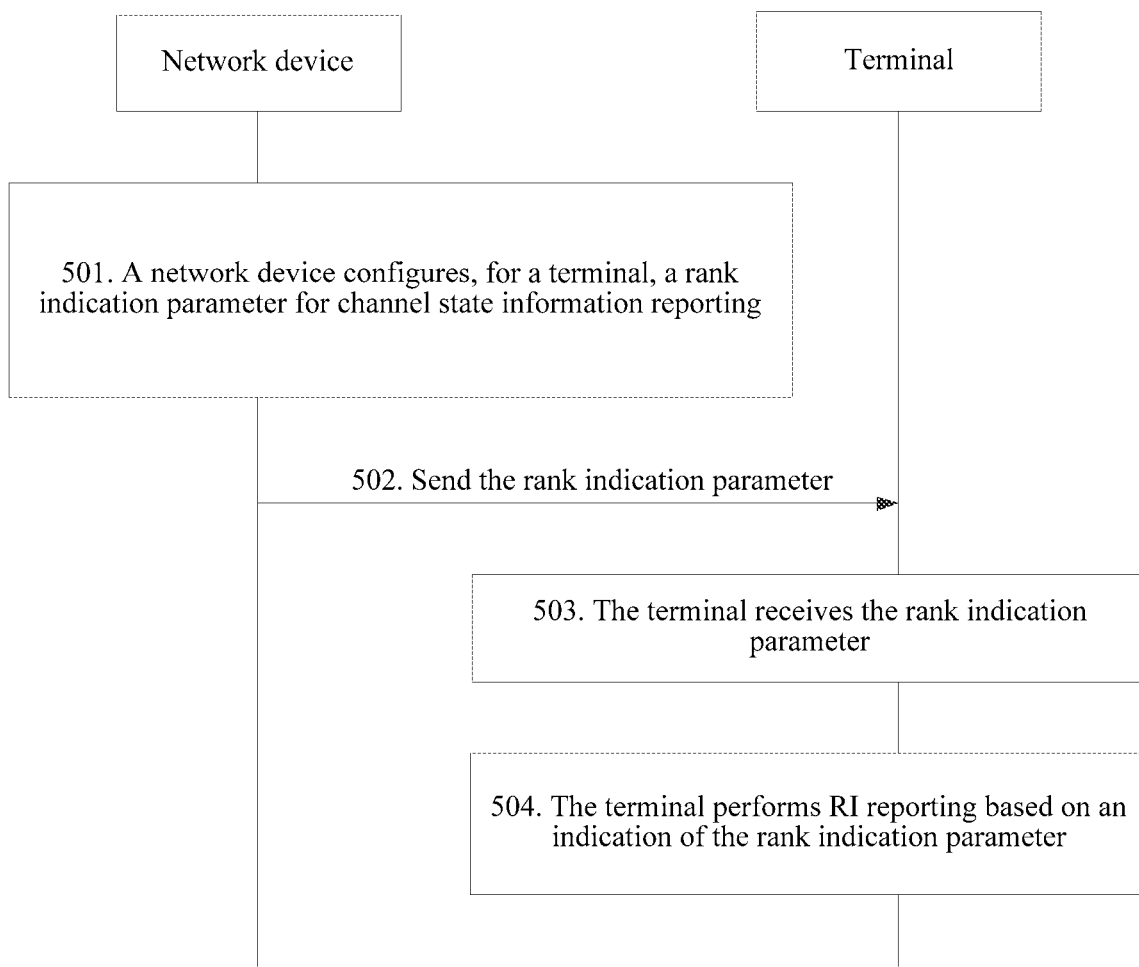
FIG. 4 is a method flowchart of a rank indication and reporting method according to an embodiment of this application.

FIG. 4 is a flowchart of a rank indication method according to an embodiment of this application. The rank indication method may be applied to a rank indication system including a transmit end device and a receive end device. The transmit end device may be any base station in the implementation environment shown in FIG. 1, and the receive end device may be the terminal device in the implementation environment shown in FIG. 1. Referring to FIG. 4, the rank indication method includes the following steps.

At step 501, a network device configures, for a terminal device, a rank indication parameter for channel state information reporting, where the rank indication parameter includes a rank indication restriction parameter that is used to restrict a rank to be reported by the terminal device.

Step 501 may be performed by the processing module 302 or the processor 402 of the transmit end device. Step 501 may be specifically that the processing module 302 of the transmit end device configures the rank indication parameter, or may be that the processor 402 of the transmit end device generates the rank indication parameter.

In this embodiment, the rank indication restriction parameter configured by the network device may have the following forms:

In a first case, regardless of whether the network device configures a CQI number, and regardless of whether the CQI number is set to 1 or 2, the rank indication restriction parameter is normally configured. For example, in the TypeI-SinglePanel-RI-Restriction=$[r_7, r_6, r_5, r_4, r_3, r_2, r_1, r_0]$, the network device may set any one or more bits of r7, r6, r5, r4, r3, r2, r1, and r0 to 1, and even if the network device has not configured the CQI number or a configured CQI number is 1, at least one bit of $r_3$, $r_2$, $r_1$, and $r_0$ is not intentionally set to 1. An effective solution is provided for this case on a terminal device side in this application.

In a second case, when the network device has not configured a CQI number for the terminal device or a configured CQI number is equal to 1, the rank indication restriction parameter is configured adaptively, to avoid that the terminal device cannot perform reporting. Using the TypeI-SinglePanel-RI-Restriction as an example, in the TypeI-SinglePanel-RI-Restriction=$[r_7, r_6, r_5, r_4, r_3, r_2, r_1, r_0]$, it is set that at least one of ranks whose index numbers are 0, 1, 2, and 3 (namely, ranks whose values are 1, 2, 3, and 4, to be specifically, a rank 1, a rank 2, a rank 3, and a rank 4) is allowed to be reported.

An implementation of setting that at least one of the ranks whose index numbers are 0, 1, 2, and 3 is allowed to be reported is: not all bits $r_0$, $r_1$, $r_2$, and $r_3$ corresponding to the ranks whose index numbers are 0, 1, 2, and 3 are set to 0. In other words, at least one of the bits need to be set to 1.

When the CQI number configured by the network device is equal to 2, regardless of how the rank indication restriction parameter is configured, as described above, the terminal device can normally perform RI or PMI reporting. Details are not described herein again.

At step 502, the network device sends the rank indication parameter to the terminal device.

After generating the rank indication parameter, the network device may send the rank indication parameter to the terminal device. Step 502 may be performed by the transceiver module 304 or the transceiver 404 of the network device. Step 502 may be specifically that the transceiver module 304 of the network device sends the rank indication parameter to the terminal device, or the transceiver 404 of the network device sends the rank indication parameter to the terminal device.

Optionally, the network device may send the rank indication parameter to the receive end device by using at least one of physical layer signaling, Media Access Control (MAC) layer signaling, and Radio Resource Control (RRC) signaling. For example, the network device sends the rank indication parameter to the terminal device by using the physical layer signaling, the MAC layer signaling, or the RRC signaling, or the network device sends the rank indication parameter to the terminal device by using the physical layer signaling or the RRC signaling, or the network device sends the rank indication parameter to the terminal device by using the physical layer signaling and the MAC layer signaling.

Certainly, in actual application, the transmit end device may send the rank indication parameter to the terminal device by using other signaling than the three kinds of signaling. Details are not described herein again in this embodiment of this application.

It should be noted that in a general case, a sending period of the rank indication parameter is relatively long. Therefore, preferably, the rank indication parameter may be sent to the terminal device by using the MAC layer signaling or the RRC signaling. However, when the terminal device needs to be frequently or dynamically indicateed to perform channel state information reporting, the rank indication parameter may be sent to the terminal device by preferably using the physical layer signaling. Optionally, the rank indication parameter may be sent by using a message, or sent by using a plurality of messages. This is not limited in this embodiment of this application.

In the three kinds of signaling used when the rank indication parameter is sent, the physical layer signaling is also referred to as layer 1 (L1) signaling, and may usually be carried in a control portion of a physical layer frame. A typical example of the L1 signaling is downlink control information (DCI) carried on a PDCCH defined in the LTE standard. In some cases, the L1 signaling may alternatively be carried in a data portion of a physical layer frame. It is not difficult to learn that a sending period or a signaling period of the L1 signaling is usually a period of the physical layer frame. Therefore, the signaling is usually used to implement some dynamic control, so as to transfer some frequently-changed information. For example, the rank indication parameter may be delivered by using the physical layer signaling. The MAC layer signaling belongs to layer 2 signaling, and may be carried in, for example, but not limited to, a frame header of a layer 2 frame. The frame header may further carry, for example, but not limited to, information such as a source address and a destination address. In addition to the frame header, the layer 2 frame usually includes a frame body. In some cases, the L2 signaling may alternatively be carried in a frame body of the layer 2 frame. A typical example of the layer 2 signaling is signaling carried in a frame control field in a frame header of a MAC frame in the 802.11 series of standard, or a MAC control entity (MAC-CE) defined in some communication protocols. The layer 2 frame may be usually carried in the data portion of the physical layer frame. The RRC signaling belongs to layer 3 signaling and is usually some control messages, and the L3 signaling may usually be carried in the frame body of the layer 2 frame. A sending period or a control period of the L3 signaling is usually relatively long, and the L3 signaling is suitable for sending some information not frequently changed. For example, in some existing communication standards, the L3 signaling is usually used to carry some configuration information. Only principles of the physical layer signaling, the MAC layer signaling, the RRC signaling, the layer 1 signaling, the layer 2 signaling, and the layer 3 signaling are described in this paragraph. For details about the three kinds of signaling, refer to the prior art, and details are not described herein again in this embodiment of this application.

At step 503, the terminal device receives the rank indication parameter.

When the network device sends the rank indication parameter to the terminal device, the terminal device may receive the rank indication parameter. Step 503 may be performed by the transceiver module 304 or the transceiver 404 of the terminal device. Step 503 may be specifically that the transceiver module 304 of the terminal device receives the rank indication parameter, or the transceiver 404 of the terminal device receives the rank indication parameter.

Optionally, the terminal device may receive the rank indication parameter by using at least one of the physical layer signaling, the MAC layer signaling, and the RRC signaling. For example, the terminal device receives the rank indication parameter by using the physical layer signaling, the MAC layer signaling, or the RRC signaling, or the terminal device receives the rank indication parameter by using the physical layer signaling and the RRC signaling, or the terminal device receives the rank indication parameter by using the physical layer signaling and the MAC layer signaling. Certainly, in actual application, the terminal device may receive the rank indication parameter by using other signaling than the foregoing three kinds of signaling. Details are not described herein again in this embodiment of this application. It needs to be noted that step 503 and step 502 are two corresponding processes. In step 503, the terminal device receives the rank indication parameter by using the same signaling as that used by the network device in sending the rank indication parameter to the terminal device in step 502. For descriptions of the physical layer signaling, the MAC layer signaling, and the RRC signaling, refer to step 502, and details are not described herein again in this step.

At step 504, the terminal device performs RI reporting based on an indication of the rank indication parameter.

Step 504 may be performed by the transceiver module 302 or the processor 402 of the terminal device. Specifically, the processing module 302 of the terminal device performs RI reporting based on the rank indication parameter; or the processor 402 of the terminal device performs RI reporting based on the rank indication parameter.

In this embodiment of this application, in two cases of the rank indication restriction parameter in the rank indication parameter sent by the network device, the terminal device can perform RI reporting. Details are described below.

In a first case, regardless of whether the network device configures a CQI number and whether the CQI number is set to 1 or 2, each rank indication restriction parameter is normally configured.

For this case, if the network device has not configured the CQI number, or the network device configures the CQI number as 1 and the network device normally configures the rank indication parameter, the terminal device may perform the following processing:

1.1. When at least one of the bits corresponding to the ranks whose index numbers are 0, 1, 2, and 3 in the rank indication parameter RI-Restriction is set to 1, the terminal device selects, from ranks corresponding to the bits set to 1, one or more ranks for reporting. In this embodiment, the ranks whose index numbers are 0, 1, 2, and 3 are correspondingly a rank 1, a rank 2, a rank 3, and a rank 4. In another implementation, index numbers of the rank 1, the rank 2, the rank 3, and the rank 4 may be 4, 5, 6, and 7. Provided that the index numbers point to the rank 1, the rank 2, the rank 3, and the rank 4, regardless of how the index numbers are represented, the index numbers shall fall within the protection scope of this application. This is similar for other embodiments in this application.

For example, when the TypeI-SinglePanel-RI-Restriction=$[r_7, r_6, r_5, r_4, r_3, r_2, r_1, r_0]$=[1, 0, 0, 0, 1, 1, 0, 0], although $r_7$ is set to 1, the CQI number is not configured or the CQI number is 1; therefore, a rank 8 corresponding to the bit $r_7$ is restricted from being reported; and the terminal device selects, from a rank 4 and a rank 3 corresponding to the bits $r_3$ and $r_2$ that are set to 1, one or more ranks for RI reporting.

1.2. In the rank indication parameter RI-Restriction, when all the bits corresponding to the ranks whose index numbers are 0, 1, 2, and 3 are set to 0, the terminal device selects, from the ranks whose index numbers are 0, 1, 2, and 3, one or more ranks for reporting.

For example, in the TypeI-SinglePanel-RI-Restriction= $[r_7, r_6, r_5, r_4, r_3, r_2, r_1, r_0]$=[1, 0, 0, 0, 0, 0, 0, 0], although $r_7$ is set to 1, the CQI number is not configured or the CQI number is 1; therefore, a rank 8 corresponding to the bit $r_7$ is restricted from being reported. However, in this case, all of $r_3, r_2, r_1$, and $r_0$ are 0. In other words, all ranks whose index numbers are 3, 2, 1, and 0 are restricted from being reported. Based on an indicateindication of the TypeI-SinglePanel-RI-Restriction, the terminal device cannot continue to perform RI reporting. This embodiment of this application provides two solutions. In a first solution, the terminal device selects, from the ranks whose index numbers are 0, 1, 2, and 3, one rank for reporting. For example, the rank may be a rank having a smallest index number, for example, a rank 1 corresponding to the index number 0, or may be a rank 1 having a smallest value. The rank whose index number is 0 may also be referred to as a rank whose value is 1. In a second solution, the terminal device selects, from ranks whose index numbers are 0, 1, 2, 3, 4, 5, 6, and 7, at least one rank for reporting. In other words, in this case, the terminal device automatically confirms that none of the ranks whose index numbers are 0, 1, 2, 3, 4, 5, 6, and 7 is restricted, and all the ranks may be used for RI reporting. Based on a measurement result of the terminal device, the terminal device selects an RI corresponding to one or more ranks for reporting, instead of being restricted by the indication of the TypeI-SinglePanel-RI-Restriction.

If the network device configures the CQI number as 2, and the network device normally configures the rank indication parameter, as described above, the terminal device may normally perform RI reporting, and details are not described herein again.

In a second case, when the network device has not configured the CQI number for the terminal device or a configured CQI number is equal to 1, the network device performs an adaptive configuration on the rank indication restriction parameter, so as to avoid that the terminal device cannot perform reporting. In other words, the rank indication restriction parameter is configured as that at least one of the ranks whose index numbers are 0, 1, 2, and 3 is allowed to be reported by the terminal device.

Using the TypeI-SinglePanel-RI-Restriction as an example, it is set that in the TypeI-SinglePanel-RI-Restriction=$[r_7, r_6, r_5, r_4, r_3, r_2, r_1, r_0]$, at least one of the ranks whose index numbers are 0, 1, 2, and 3 (in other words, ranks whose values are 1, 2, 3, and 4, namely, a rank 1, a rank 2, a rank 3, and a rank 4) is allowed to be reported. In other words, if not all of $r_3, r_2$, nand $r_0$ are set to 0 or at least one of $r_3, r_2, r_1$, and $r_0$ is set to 1, the terminal device may perform the following processing:

When at least one of the bits corresponding to the ranks whose index numbers are 0, 1, 2, and 3 in the rank indication parameter RI-Restriction is set to 1, the terminal device selects, from ranks corresponding to the bits set to 1, one or more ranks for reporting. In this embodiment, the ranks whose index numbers are 0, 1, 2, and 3 are correspondingly a rank 1, a rank 2, a rank 3, and a rank 4. In another implementation, index numbers of the rank 1, the rank 2, the rank 3, and the rank 4 may be 4, 5, 6, and 7. Provided that the index numbers point to the rank 1, the rank 2, the rank 3, and the rank 4, regardless of how the index numbers are represented, the index numbers shall fall within the protection scope of this application. This is similar for other embodiments in this application.

For example, in the TypeI-SinglePanel-RI-Restriction= $[r_7, r_6, r_5, r_4, r_3, r_2, r_1, r_0]$=[1, 0, 0, 0, 1, 1, 0, 0], although r is set to 1, the CQI number is not configured or the CQI number is 1; therefore, a rank 8 corresponding to the bit $r_7$ is restricted from being reported; and the terminal device selects, from a rank 4 and a rank 3 corresponding to the bits $r_3$ and $r_2$ that are set to 1, one or two ranks for RI reporting.

When the CQI number configured by the network device is equal to 2, regardless of how the rank indication restriction parameter is configured, as described above, the terminal device can normally perform RI or PMI reporting. Details are not described herein again.

According to the rank indication method and the rank indication reporting method provided in this embodiment of this application, impact of the CQI number/CQI maximum number is comprehensively considered, so that the terminal device can normally perform RI reporting regardless of how the rank indication restriction parameter is configured.

A process in which how the network device configures the rank indication parameter that includes the rank indication restriction parameter and how the terminal device selects, based on the rank indication parameter, a corresponding rank for RI reporting is described above. When the terminal device performs RI reporting, a number of bits (RI payload) occupied by the RI reporting depends on a configuration of the RI restriction parameter. As described above, there is an overhead waste problem in the prior art, and solutions in this embodiment of this application are described in detail below.

A first manner is: when the terminal device has not received a channel quality indication number configured by the network device for the terminal device or when a received channel quality indication number is 1, the terminal device detremines that a number of bits used for rank indication reporting is equal to min (2, $X_1=\lceil \log_2 Y_1 \rceil$), where $X_1 \geq 1$, $Y_1$ is a maximum value of ranks that are allowed to be reported in the ranks whose index numbers are 0, 1, 2, 3, 4, 5, 6, and 7 indicated by the rank indication restriction parameter, and $X_1$ and $Y_1$ are positive integers. The terminal device reports, by using the determined number of bits, a maximum value of ranks that are allowed to be reported in the ranks whose index numbers are 0, 1, 2, and 3 indicated by the rank indication restriction parameter, as the rank indication; or when a channel quality indication number that is received by the terminal device and configured by the network device for the terminal device is 2, the terminal device determines that a number of bits used for rank indication reporting is equal to min (3, $X_2=\lceil \log_2 Y_2 \rceil$), where $Y_2$ is a maximum value of ranks that are allowed to be reported in the ranks whose index numbers are 0, 1, 2, 3, 4, 5, 6, and 7 indicated by the rank indication restriction parameter, and $X_2$ and $Y_2$ are positive integers; and the terminal device reporting, by using the determined number of bits, a maximum value of ranks that are allowed to be reported in the ranks whose index numbers are 0, 1, 2, 3, 4, 5, 6, and 7 indicated by the rank indication restriction parameter, as the rank indication.

In the first manner, to avoid unnecessary reporting bit overheads, for a case in which the CQI number is not configured or the CQI number is 1, it is set that a minimum value of reporting bits is selected for reporting from 2 and an actual number of reporting bits. In this case, reporting bit overheads may be strictly limited. In this case, the maximum value of the ranks that are allowed to be reported in the ranks whose index numbers are 0, 1, 2, 3, 4, 5, 6, and 7 is reported. For example, when the TypeI-SinglePanel-RI-Restriction= $[r_7, r_6, r_5, r_4, r_3, r_2, r_1, r_0]$ =[1,0,0,0,0,0,1,1], and when the terminal device selects the ranks whose index numbers are 0, 1, 2, 3, 4, 5, 6, and 7 for RI reporting, the maximum value is $Y_1=8$, and $X_1=\lceil\log_2 Y_1\rceil=3$. The number of bits used for rank indication reporting is equal to min $(2, X_1=\lceil\log_2 Y_1\rceil)$, and it is determined that two bits are used for reporting.

However, because the CQI number is not configured or is configured as 1, in this case, the terminal device can only select, from $r_3$, $r_2$, $r_1$, and $r_0$, a rank corresponding to $r_1$ or $r_0$ for reporting, a rank value corresponding to the $r_1$ is equal to 2, and in this case, the number of bits used for rank indication reporting is equal to min $(2, X_1=\lceil\log_2 Y_1\rceil)$. To be specific, a minimum value 2 is selected, and two bits are used for reporting.

For another example, when the TypeI-SinglePanel-RI-Restriction=$[r_7, r_6, r_5, r_4, r_3, r_2, r_1, r_0]$=$[0,0,0,0,0,0,0,1]$, and when the terminal device selects the ranks whose index numbers are 0, 1, 2, 3, 4, 5, 6, and 7 for RI reporting, the maximum value is $Y_1=1$, and $X_1=\lceil\log_2 Y_1\rceil=1$. The number of bits used for rank indication reporting is equal to min $(2, X_1=\lceil\log_2 Y_1\rceil)$, and in this case, it is determined that one bit is used for reporting For a case in which the CQI number is 2, it is set that a minimum value of reporting bits is selected for reporting from 3 and an actual number of reporting bits. In this case, reporting bit overheads may be strictly limited. In this case, the maximum value of the ranks that are allowed to be reported in the ranks whose index numbers are 0, 1, 2, 3, 4, 5, 6, and 7 is reported. For example, when the terminal device selects the ranks whose index numbers are 0, 1, 2, 3, 4, 5, 6, 7 for RI reporting, and when the TypeI-SinglePanel-RI-Restriction=$[r_7, r_6, r_5, r_4, r_3, r_2, r_1, r_0]$=$[1, 1, 0, 0, 0, 0, 1, 0]$, the maximum value is $Y_2=8$, needed bits are $X_2=\lceil\log_2 Y_2\rceil=3$ bits, and in this case, the number of bits used for rank indication reporting is equal to min $(3, X_2=\rceil\log_2 Y_2\lceil)$. To be specific, three bits are used for reporting. If the TypeI-SinglePanel-RI-Restriction=$[r_7, r_6, r_5, r_4, r_3, r_2, r_1, r_0]$=$[0, 0, 0, 0, 1, 0, 1, 0]$, when a maximum value of ranks that actually need to be reported is a rank 4, $Y_2=4$, needed bits are $X_2=\lceil\log_2 Y_2\rceil=2$ bits, and in this case, the number of bits used for rank indication reporting is equal to min $(3, X_2=\lceil\log_2 Y_2\rceil)$. To be specific, two bits are reported.

It can be learned from above that compared with the prior art, in the first manner of determining the number of bits used for reporting, the number of bits is reduced.

A second manner is: the selecting, from the ranks whose index numbers are 0, 1, 2, and 3, at least one rank for reporting when the terminal device has not received a channel quality indication number configured by the network device for the terminal device, or when a received channel quality indication number is 1 includes: determining that a number of bits used for rank indication reporting is $N_1=\lceil\log_2 M_1\rceil$, where $N_1\geq 1$, $M_1$ is a number of elements in which the bits corresponding to the ranks whose index numbers are 0, 1, 2, and 3 indicated by the rank indication restriction parameter are set to 1, and $N_1$ and $M_1$ are positive integers; and reporting, by using the determined number $N_1$ of bits, an index number of a rank whose corresponding bit is set to 1 in the ranks whose index numbers are 0, 1, 2, and 3.

The manner further includes: when a channel quality indication number that is received by the terminal device and configured by the network device is 2, determining that a number of bits used for rank indication reporting is $N_2=\lceil\log_2 M_2\rceil$, where $N_2\geq 1$, $M_2$ is a number of elements in which bits corresponding to the ranks whose index numbers are 0, 1, 2, 3, 4, 5, 6, and 7 indicated by the rank indication restriction parameter are set to 1, and $N_2$ and $M_2$ are positive integers; and reporting, by using the determined number of bits, an index number of a rank whose corresponding bit is set to 1 in the ranks whose index numbers are 0, 1, 2, 3, 4, 5, 6, and 7.

In the second manner, only bits set to 1 are reported as index numbers of corresponding ranks, and reporting overheads can be greatly reduced.

In this embodiment of this application, a description is provided mainly by using RI indication and reporting as an example. In communication, the channel state information may include at least one of the CQI, the PMI, a CRI, and the RI. After performing channel measurement on a reference signal resource, the terminal device may obtain a measurement report, and feed back the measurement report to the network device, so that the network device can better process transmit data based on content of the measurement report, or schedule the terminal device based on content of the measurement report. The measurement report may also include the channel state information. For descriptions of performing channel measurement by the terminal device, feeding back the measurement report by the terminal device to the network device, and performing subsequent processing by the network device based on the content of the measurement report, refer to related technologies, and details are not described herein again in this embodiment of this application.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The sequence numbers of the foregoing embodiments of this application are merely for illustrative purposes, and are not intended to indicate priorities of the embodiments.

A person of ordinary skill in the art may understand that all or some of the steps of the embodiments may be implemented by hardware or a program indicateing related hardware. The program may be stored in a computer-readable storage medium. The storage medium may be a read-only memory, a magnetic disk, a compact disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A method for rank indication in a wireless communications system, comprising:
    configuring, by a network device, a rank indication parameter for reporting channel state information for a communication device, wherein the rank indication parameter comprises a rank indication restriction parameter for restricting a rank reported by the communication device, wherein the rank indication restriction parameter forms a bit sequence $r_7$, $r_6$, $r_5$, $r_4$, $r_3$, $r_2$, $r_1$, $r_0$, each of which corresponds to a rank, and bit value 1 indicates that a rank indication of the corresponding rank is allowed to be reported; and
    receiving, by the network device, a rank indication reported by the communication device, wherein the rank indication is determined according to a number of bits set to 1 in the rank indication.

2. The method according to claim 1, wherein a number of bits for reporting the rank indication is $N=\lceil \log_2 M \rceil$, wherein $N \geq 1$, and M is the number of bits set to 1 in the bit sequence $r_7, r_6, r_5, r_4, r_3, r_2, r_1, r_0$.

3. The method according to claim 1, wherein the rank indication restriction parameter is a TypeI-SinglePanel-RI-Restriction for restricting a precoding matrix indicator (PMI) and a rank indication (RI) of a Type I Single Panel codebook.

4. The method according to claim 1, wherein the rank indication restriction parameter is any one or more of a TypeI-MultiPanel-RI-Restriction for restricting PMI and RI of a TypeI-MultiPanel codebook, a TypeII-RI-Restriction for restricting a precoding matrix indicator (PMI) and a rank indication (RI) of a Type II codebook, or a TypeII-PortSelection-RI-Restriction for restricting PMI and RI of a TypeII-PortSelection codebook.

5. The method according to claim 1, wherein $r_0$ is a least significant bit (LSB) of the bit sequence, $r_7$ is a most significant bit (MSB) of the bit sequence, $r_0$ corresponds to rank 1, and $r_7$ corresponds to the rank 8.

6. The method according to claim 1, wherein the rank indication parameter is carried in at least one of a physical layer signal, a media access control layer signal, and a radio resource control signal.

7. A network device, comprising:
a processor, used to configure a rank indication parameter for reporting channel state information for a communication device, wherein the rank indication parameter comprises a rank indication restriction parameter for restricting a rank reported by the communication device, wherein the rank indication restriction parameter forms a bit sequence $r_7, r_6, r_5, r_4, r_3, r_2, r_1, r_0$, each of which corresponds to a rank, and bit value 1 indicates that a rank indication of the corresponding rank is allowed to be reported; and
a transceiver, configured to, in coordination with the processor, receive a rank indication reported by the communication device, wherein the rank indication is determined according to a number of bits set to 1 in the rank indication.

8. A network device according to claim 7, wherein a number of bits for reporting the rank indication is $N=\lceil \log_2 M \rceil$, wherein $N \geq 1$, and M is the number of bits set to 1 in the bit sequence $r_7, r_6, r_5, r_4, r_3, r_2, r_1, r_0$.

9. A network device according to claim 8, wherein the rank indication restriction parameter is a TypeI-SinglePanel-RI-Restriction for restricting a precoding matrix indicator (PMI) and a rank indication (RI) of a Type I Single Panel codebook.

10. A network device according to claim 8, wherein the rank indication restriction parameter is any one or more of a TypeI-MultiPanel-RI-Restriction for restricting a precoding matrix indicator (PMI) and a rank indication (RI) of a TypeI-MultiPanel codebook, a TypeII-RI-Restriction for restricting a PMI and a RI of a Type II codebook, or a TypeII-PortSelection-RI-Restriction for restricting a PMI and a RI of a TypeII-PortSelection codebook.

11. The network device according to claim 8, wherein $r_0$ is a least significant bit (LSB) of the bit sequence, $r_7$ is a most significant bit (MSB) of the bit sequence, $r_0$ corresponds to rank 1, and $r_7$ corresponds to the rank 8.

12. The network device according to claim 8, wherein the rank indication parameter is carried in at least one of a physical layer signaling, a media access control layer signaling, and a radio resource control signaling.

13. A non-transitory computer readable storage medium, wherein the non-transitory computer readable storage medium stores instructions, that when executed by a processor cause the processor to perform a method for rank indication in a wireless communications system, the method comprising:
configuring, a rank indication parameter for reporting channel state information for a communication device, wherein the rank indication parameter comprises a rank indication restriction parameter for restricting a rank reported by the communication device, wherein the rank indication restriction parameter forms a bit sequence $r_7, r_6, r_5, r_4, r_3, r_2, r_1, r_0$, each of which corresponds to a rank, and bit value 1 indicates that a rank indication of the corresponding rank is allowed to be reported; and
receiving, a rank indication reported by the communication device, wherein the rank indication is determined according to a number of bits set to 1 in the rank indication.

14. The non-transitory computer readable storage medium according to claim 13, wherein a number of bits for reporting the rank indication is $N=\lceil \log_2 M \rceil$, wherein $N \geq 1$ and M is the number of bits set to 1 in the bit sequence $r_7, r_6, r_5, r_4, r_3, r_2, r_1, r_0$.

15. The non-transitory computer readable storage medium according to claim 13, wherein the rank indication restriction parameter is a TypeI-SinglePanel-RI-Restriction for restricting a precoding matrix indicator (PMI) and a rank indication (RI) of a Type I Single Panel codebook.

16. The non-transitory computer readable storage medium according to claim 13, wherein the rank indication restriction parameter is any one or more of a TypeI-MultiPanel-RI-Restriction for restricting a precoding matrix indicator (PMI) and a rank indication of a TypeI-MultiPanel codebook, a TypeII-RI-Restriction for restricting a PMI and a RI of a Type II codebook, or a TypeII-PortSelection-RI-Restriction for restricting a PMI and a RI of a TypeII-PortSelection codebook.

17. The non-transitory computer readable storage medium according to claim 13, wherein $r_0$ is a least significant bit (LSB) of the bit sequence, $r_7$ is a most significant bit (MSB) of the bit sequence, $r_0$ corresponds to rank 1, and $r_7$ corresponds to the rank 8.

18. The non-transitory computer readable storage medium according to claim 13, wherein the rank indication parameter is carried in at least one of a physical layer signal, a media access control layer signal, and a radio resource control signal.

19. A chip, comprising: a processor and a non-transitory memory storing instructions, that when executed by the processor cause the chip to perform a method for rank indication in a wireless communications system, the method comprising:
configuring, a rank indication parameter for reporting channel state information for a communication device, wherein the rank indication parameter comprises a rank indication restriction parameter for restricting a rank reported by the communication device, wherein the rank indication restriction parameter forms a bit sequence $r_7, r_6, r_5, r_4, r_3, r_2, r_1, r_0$, each of which corresponds to a rank, and bit value 1 indicates that a rank indication of the corresponding rank is allowed to be reported; and receiving, a rank indication reported by the communication device, wherein the rank indication is determined according to a number of bits set to 1 in the rank indication.

* * * * *